UNITED STATES PATENT OFFICE.

HANS A. FRASCH, OF HAMILTON, CANADA.

COBALT-AMMONIUM SALT AND PROCESS OF MAKING SAME.

SPECIFICATION forming part of Letters Patent No. 717,183, dated December 30, 1902.

Application filed August 7, 1901. Serial No. 71,206. (No specimens.)

*To all whom it may concern:*

Be it known that I, HANS A. FRASCH, a citizen of the United States, residing at Hamilton, in the county of Wentworth and Province of Ontario, Canada, have invented certain new and useful Improvements in Cobalt-Ammonium Salts and Processes of Making the Same, of which the following is a full, clear, and exact description.

This invention relates to the separation of cobalt from nickel, copper, and other metals.

In United States Letters Patent issued to me, No. 669,899, dated March 12, 1901, I set forth a method of separating nickel from copper by means of ammonia and salt. I find that if this method is applied to metallic solutions containing cobalt the cobalt may be separated by the following procedure: The metallic solutions containing cobalt are ammoniated until all the metals whose hydroxids are soluble in ammonia are dissolved. This ammoniacal solution may be obtained by treating a solution of a salt of metals with ammonia or by direct extraction of the oxids of the metals by means of ammonia. To this ammoniacal solution of metals whose hydroxids are soluble in ammonia common salt is added, when the nickel contained in the solution is precipitated in the form of a nickel-ammonium salt. If this ammoniacal solution contains cobalt, the cobalt is precipitated, together with the nickel, and thereby separated from the copper, zinc, and other metals which may have been and remain in solution. To separate the cobalt from the nickel, the precipitate is separated from the solution by means of filtration or otherwise and thoroughly washed with ammoniated salt-brine. Upon the addition of water to this ammoniacal double salt the nickel-ammonium chlorid goes into solution, while the cobalt-ammonium salt decomposes according to the formula

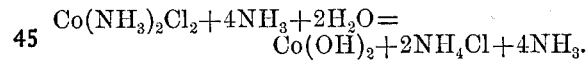

The hydroxid of cobalt obtained by this reaction is separated from the nickel-ammonium-chlorid solution by means of filtration or otherwise. The nickel-ammonium chlorid can then again be precipitated from the solution by the addition thereto of salt, while the cobalt hydroxid can be utilized as such or transformed into cobalt salts.

In place of using common salt for the precipitation, as stated in my patent hereinbefore referred to, any other salt which is capable of displacing the nickel and cobalt may be used.

The cobalt hydroxid may again be taken up in ammonia and precipitated by the addition thereto of salt, as a cobalt-ammonium salt of the composition

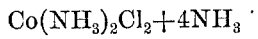

and as such, if dissolved in a solution of ammonia, may be used for plating purposes.

The cobalt salt obtained by this process is of a lilac color, soluble in a solution of ammonia, making a purplish solution. It decomposes upon the addition of water, as stated above, into cobalt hydroxid and ammonium chlorid.

What I claim is—

1. A cobalt-ammonium salt, consisting of a double salt of cobalt-ammonium chlorid, combined with four equivalents of ammonia.

2. A cobalt-ammonium salt, consisting of a double salt of cobalt-ammonium chlorid and ammonia, and possessing the constitution represented by the formula:

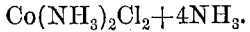

3. A cobalt-ammonium salt, possessing the constitution represented by the formula:

of lilac color, soluble in a solution of ammonia, and decomposed by water into cobalt hydroxid and ammonium chlorid.

4. The process of separating cobalt from nickel and other metals whose hydroxids are soluble in ammonia, consisting in bringing the metals into solution, adding thereto ammonia in excess, precipitating the nickel and cobalt by the addition of a salt capable of displacing them, separating the precipitated nickel-cobalt-ammonium salts by the addition thereto of water, thereby bringing the nickel-ammonium salt into solution, and precipitating the cobalt.

In testimony whereof I have hereunto set my hand this 6th day of August, A. D. 1901.

HANS A. FRASCH.

Witnesses:
A. M. HERRIMAN,
F. R. GRAHAM.